(12) United States Patent
Burgess et al.

(10) Patent No.: US 12,554,504 B2
(45) Date of Patent: Feb. 17, 2026

(54) DEPENDENCY TRACKING AND CHAINING FOR VECTOR INSTRUCTIONS

(71) Applicant: SiFive, Inc., San Mateo, CA (US)

(72) Inventors: Bradley Gene Burgess, Sunset Valley, TX (US); David Kravitz, Cambridge, MA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/139,395

(22) Filed: Apr. 26, 2023

(65) Prior Publication Data

US 2024/0362026 A1    Oct. 31, 2024

(51) Int. Cl.
*G06F 9/30* (2018.01)
*G06F 9/38* (2018.01)

(52) U.S. Cl.
CPC .......... *G06F 9/384* (2013.01); *G06F 9/30038* (2023.08); *G06F 9/3838* (2013.01)

(58) Field of Classification Search
CPC .............. G06F 9/30036; G06F 9/30038; G06F 9/3838; G06F 9/384
See application file for complete search history.

(56) References Cited

U.S. PATENT DOCUMENTS

| | | | | |
|---|---|---|---|---|
| 6,173,393 | B1 * | 1/2001 | Palanca | G06F 9/30032 712/E9.034 |
| 7,467,286 | B2 * | 12/2008 | Abdallah | G06F 9/3013 712/27 |
| 8,225,076 | B1 * | 7/2012 | Coon | G06F 9/3851 712/217 |
| 8,386,754 | B2 * | 2/2013 | Blasco Allue | G06F 9/30145 712/216 |
| 9,395,988 | B2 * | 7/2016 | Tan | G06F 9/30098 |
| 9,851,972 | B2 * | 12/2017 | Uliel | G06F 9/30036 |
| 2019/0073339 | A1 * | 3/2019 | Tao | G06F 9/30036 |
| 2022/0382546 | A1 * | 12/2022 | Tran | G06F 9/30018 |

* cited by examiner

*Primary Examiner* — Corey S Faherty
(74) *Attorney, Agent, or Firm* — Kilpatrick Townsend & Stockton LLP

(57) ABSTRACT

Apparatus and methods for dependency tracking, chaining, and/or fusing for vector instructions. A system, processor, or integrated circuit includes a renamer to generate a valid bit mask for each micro-operation decoded from a first vector instruction, where the valid bit mask indicates what portion of a mask register to write and generate a dependency bit mask for each micro-operation decoded from a second vector instruction, where the dependency bit mask is based on a relationship between the first vector instruction and the second vector instruction, and an issue queue configured to issue for execution each micro-operation from the second vector instruction when an associated dependency bit mask is cleared based on execution of appropriate micro-operations from the first vector instruction.

17 Claims, 9 Drawing Sheets

DEPENDENCY TRACKING AND CHAINING FOR VECTOR INSTRUCTIONS

TECHNICAL FIELD

This disclosure relates generally to integrated circuits and, more specifically, processing of vector instructions.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
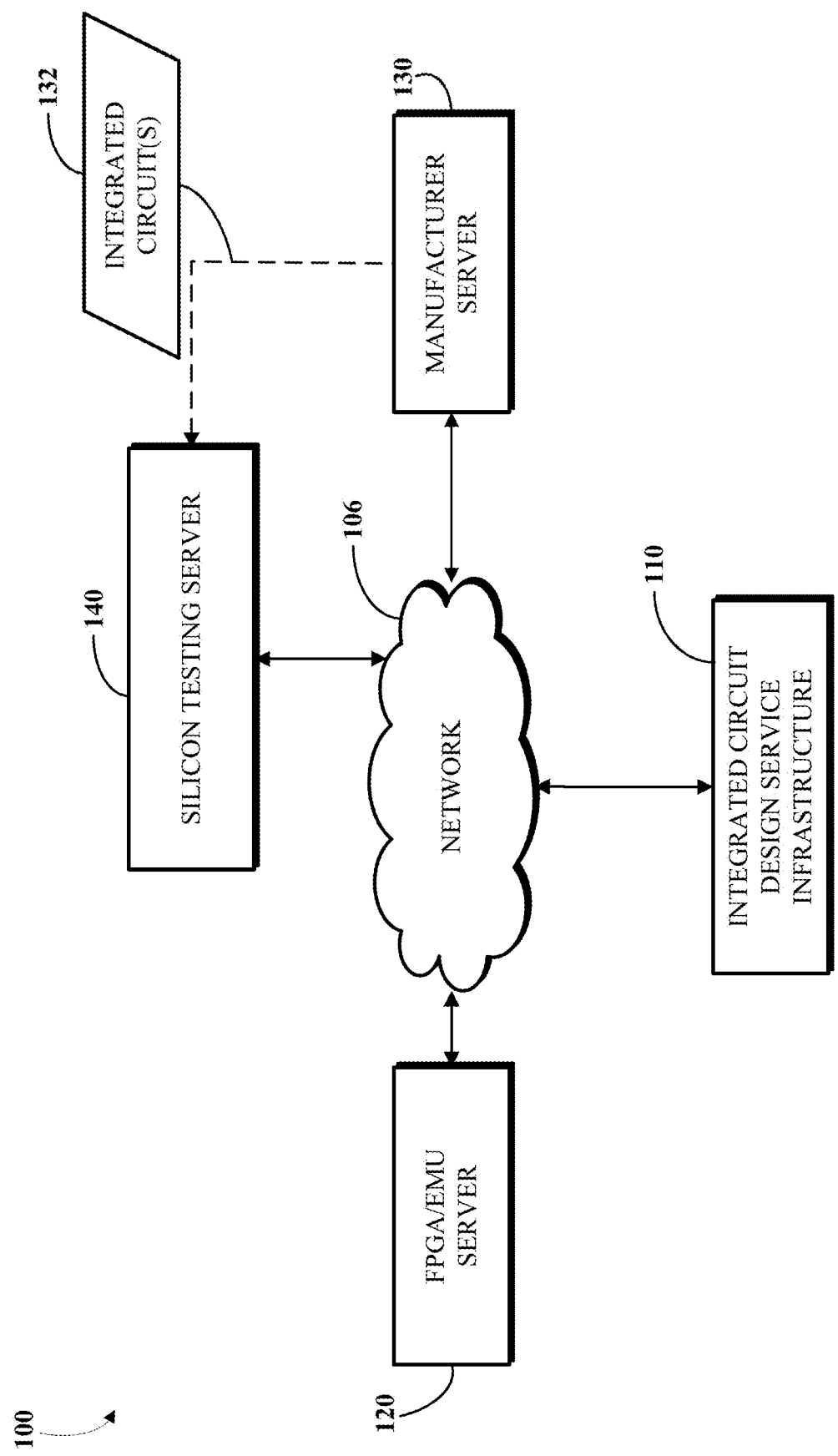
FIG. 1 is a block diagram of an example of a system for facilitating generation and manufacture of integrated circuits.

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. The processor may execute instructions out-of-order or be an on out-of-order processor. In implementations, the instructions may be vector instructions which generate masks and/or mask vectors (collectively "mask vectors") written in registers and vector instructions which read the mask registers to use or apply masks and/or mask vectors to data. Vector instructions may be cracked into one or more vector micro-operations. For a given vector instruction, all cracked vector micro-operations need to be completed before writing a mask vector to a register or before a vector micro-operation can read the register. Mask vectors represent packed bit vectors and vector micro-operations may read and write various bit fields based upon element size and a vector micro-operation sequence number. Most instructions that create a mask vector only write a portion of the register. Most instructions that use a mask vector only use a portion of the register. Instructions reading and writing various bit widths at various bit locations of mask registers create implementation challenges. Therefore, a mechanism is needed to process or handle partial results upon completion of one or more vector micro-operations cracked from a vector instruction.

Described are methods, logic, and circuitry which enable dependency tracking and chaining of vector micro-operations cracked from vector instructions. In implementations, a mask unit is provided which handles common mask writing instructions and scenarios which produce either full register results or partial mask results. For example, the common mask writing instructions may include, but is not limited to, compare instructions, logical instructions, add-with-carry instructions, and/or subtract-with-borrow instructions. The mask unit may optimize writing to dedicated or designated registers in physical register files, mask physical register files, and/or combinations thereof (collectively "mask registers" unless specifically used otherwise) by forwarding partial mask results from executed mask writing micro-operations. The partially written mask registers may then be read for use by other vector micro-operations.

In implementations, the mask registers are bit-wise and/or bit-field writeable registers, where vector length (number of bits in a register), element width (number of bits in an element in a register), and length multiplier (number of vector registers that are grouped for the instruction and related to the number of micro-operations cracked from an instruction) determine which bits are written for a micro-operation. In implementations, the designated registers may be the physical register files which are associated with an architectural or logical register V0. In implementations, the mask registers may be associated with an architectural or logical register V0.

A physical register file accumulator may be used to accumulate or buffer partial results from the mask unit. The physical register file accumulator may forward the partial results as appropriate for use by other vector instructions and also write full results to a physical register file upon receiving results from each vector micro-operation associated with a vector instruction.

In implementations, the mask physical register files may be a separate set of physical register files which may forward the partial results as appropriate for use by other vector instructions and/or vector micro-operations.

Each mask register may include or be associated with valid bits and dependency bits, where each valid bit covers a partial result from a micro-operation and each dependency bit relates dependency between a producing vector micro-operation and a consuming vector micro-operation as described herein. The number of valid bits is dependent on a maximum value of the length multiplier. The valid bits and dependency bits collectively enable dependency tracking and availability of the mask registers. That is, the valid bits and dependency bits collectively may indicate when partial results are ready for use by other vector micro-operations and what partial results are appropriate for use by other vector micro-operations, i.e., chaining. In implementations, a renamer may enable or facilitate chaining by knowing which vector micro-operations (i.e., producing vector micro-operations) from a first or mask producing vector instruction correspond to vector micro-operations (i.e., consuming vector micro-operations) from a second or consuming vector instruction. The renamer may include, for each consuming vector micro-operation, an identification or indication of which producing vector micro-operation(s) are appropriate by designating the corresponding valid bit(s). In implementations, the renamer may generate a producer valid mask or data structure for the producing vector micro-operations and a consumer dependency mask or data structure for the consuming vector micro-operations.

In implementations, an issue queue or scheduler may include logic and circuitry which tracks a state of the valid bits and the dependency bits. Upon setting of a valid bit(s) and clearing of appropriate dependency bits, the issue queue or scheduler may issue a consuming vector micro-operation which may use the now ready partial results from appropriate producing vector micro-operation(s). Upon the setting of all appropriate valid bits, clearing of the appropriate dependency bits, and forwarding and writing of the results, the mask registers can be cleared.

The mask unit along with the valid bits and dependency bits effectively provide independent handling of each micro-operation in terms of forwarding and processing (i.e., chaining, merging, or fusing) of partial results generated by the micro-operation. The mask unit along with the valid bits and dependency bits effectively provide dependency tracking at a micro-operation resolution.

To describe some implementations in greater detail, reference is first made to examples of hardware and software structures used to implement a system including components that may facilitate dependency tracking and chaining for vector instructions. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-7. The system 100 and each component in the system 100 is illustrative and can include additional, fewer, or different components which may be similarly or differently architected without departing from the scope of the specification and claims herein. Moreover, the illustrated components can perform other functions without departing from the scope of the specification and claims herein.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
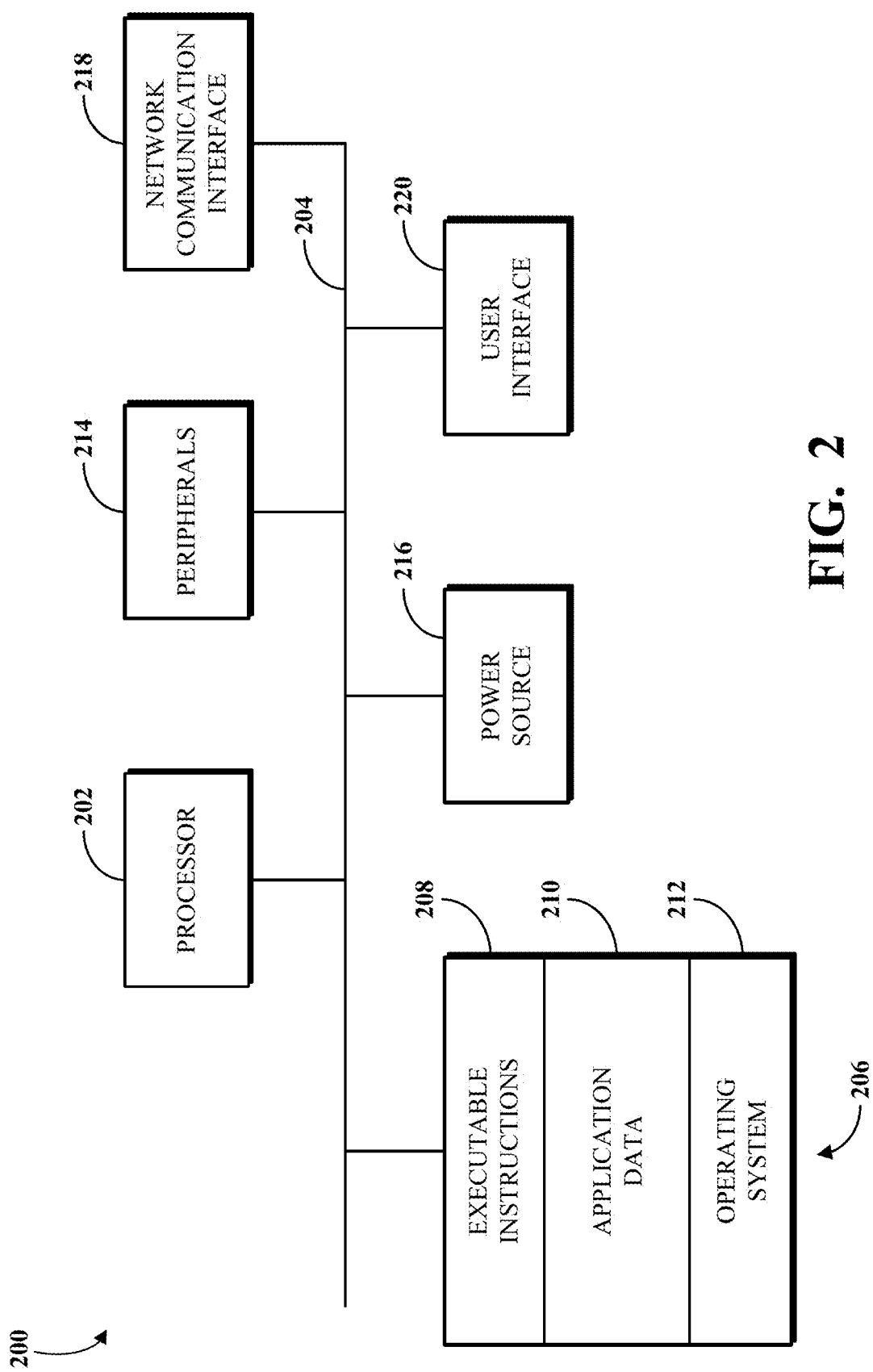
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-7. The system 200 and each component in the system 200 is illustrative and can include additional, fewer, or different components which may be similarly or differently architected without departing from the scope of the specification and claims herein. Moreover, the illustrated components can perform other functions without departing from the scope of the specification and claims herein.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
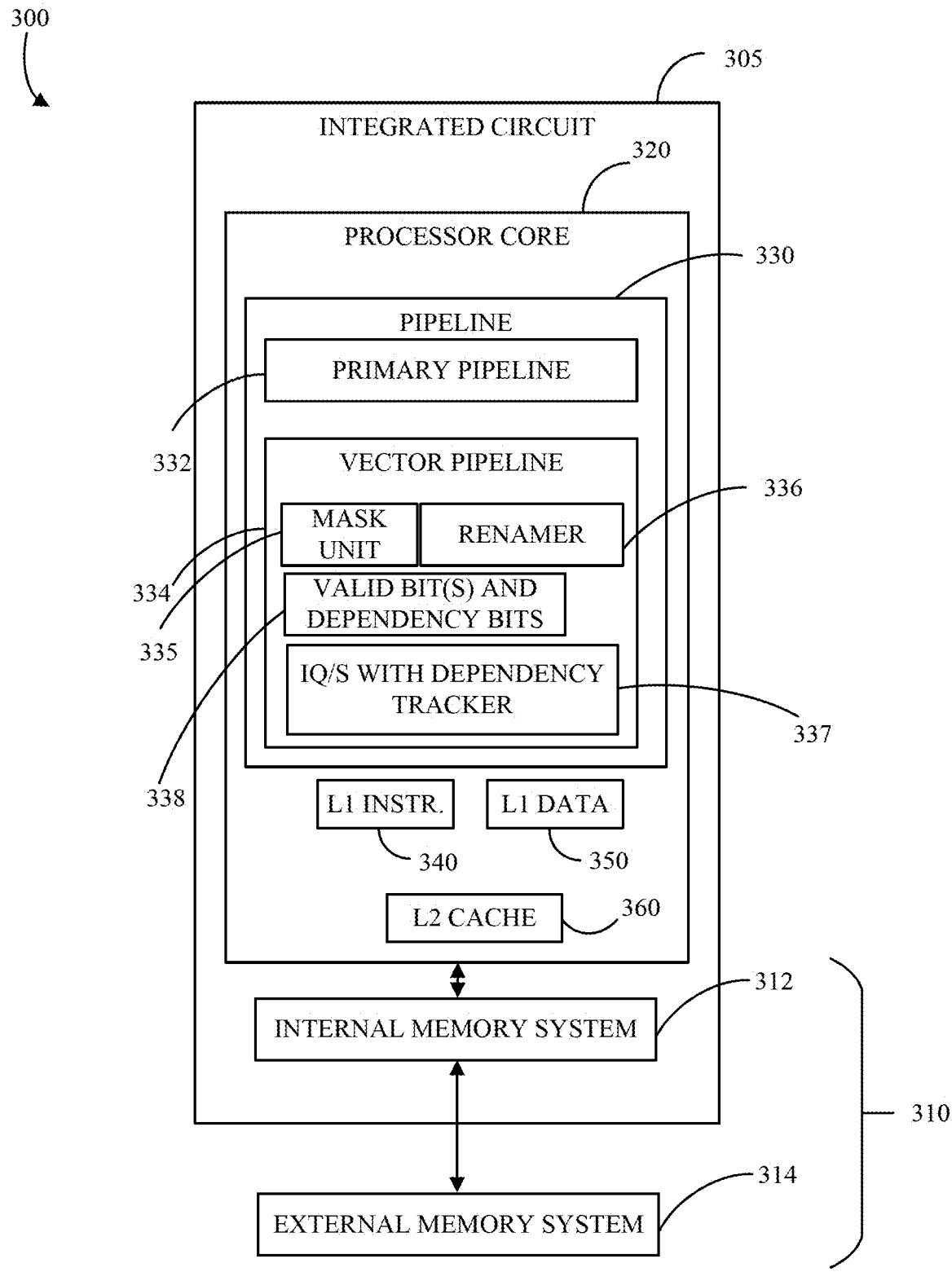
FIG. 3 is a block diagram of an example of an integrated circuit for dependency tracking and chaining for vector instructions.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360. Each of the one or more pipelines 330 may include a primary pipeline 332 and a vector pipeline 334. The primary pipeline 332 and the vector pipeline 334 may each have separate decode units, rename units, dispatch units, execution units, physical and/or virtual registers, caches, queues, data paths, and/or other logic associated with instruction flow. The vector pipeline 334 may include a mask unit 335, a renamer 336, and an issue queue or scheduler with dependency tracking logic and/or circuit 337 which use valid bit(s) and dependency bit(s) 338 to facilitate dependency tracking, chaining, merging, and/or fusing for vector instructions as described herein. In some implementations, the primary pipeline 332 and the vector pipeline 334 may be out-of-order pipelines. The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

Figure 4:
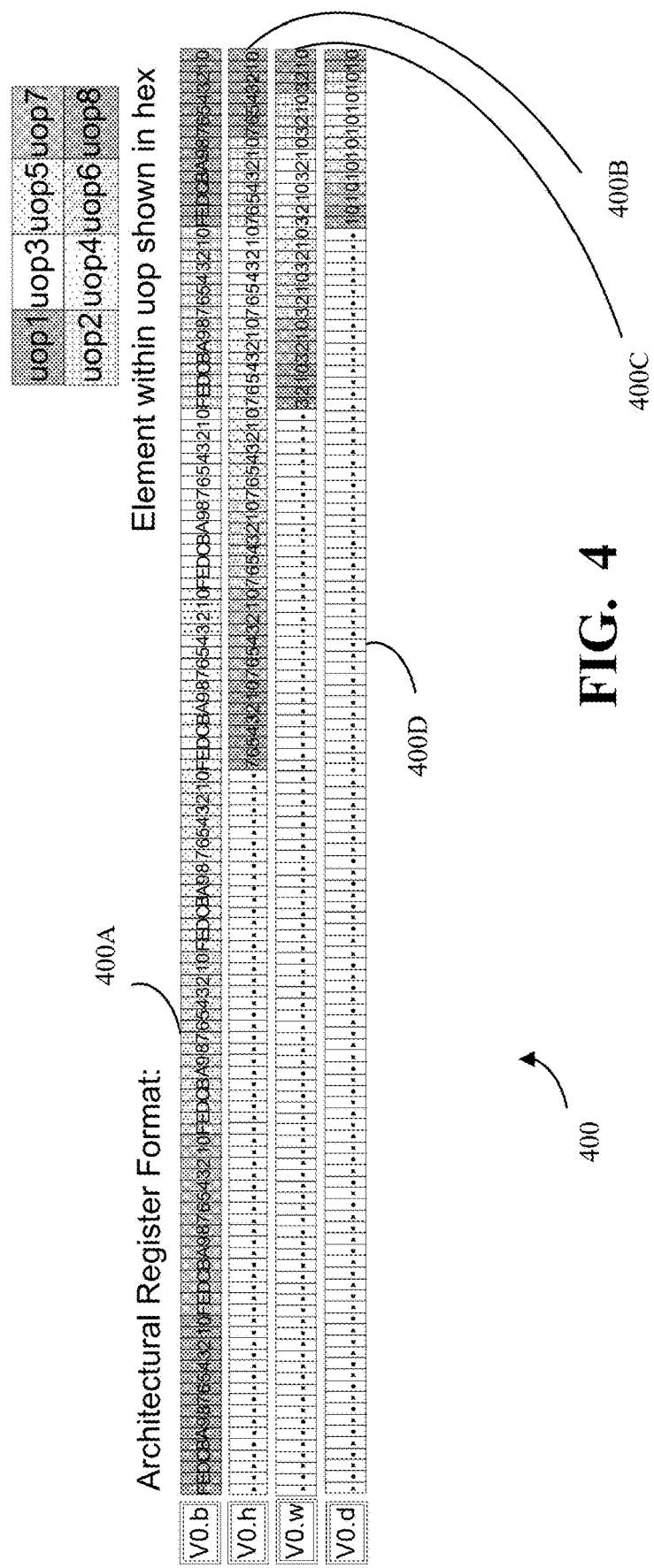
FIG. 4 is a block diagram illustrating mask registers.

FIG. 4 is a block diagram illustrating a mask register 400, namely, which shows a relationship of masks and register groups. A mask register 400 is a single register bit-vector with a packed group of partial masks which are directly associated with the individual registers of the register group. For example, for a length multiplier equal to 1, a compare instruction writes a result to bit-field location 1. For a length multiplier equal to 8, a compare instruction is cracked into eight micro-operations with each writing a result to different partial mask locations (1 through 8). Furthermore, since the number of elements of a register depends upon element size (element width), the size of these partial masks will depend upon the element size. Table 1 shows an example of vector cracking, vector decoding, or vector sequencing, i.e., micro-operation generation from a vector instruction. In this instance, the vector operation is a vector add which is decoded into 8 micro-operations.

TABLE 1

Length Multiplier = 8, where Length Multiplier specifies the number of vector registers that are grouped Macro instruction: vadd.vv v16, v8, v0
Micro-op:
vadd.vv v16, v8, v0
vadd.vv v17, v9, v1
vadd.vv v18, v10, v2
vadd.vv v19, v11, v3
vadd.vv v20, v12, v4
vadd.vv v21, v13, v5
vadd.vv v22, v14, v6
vadd.vv v23, v15, v7

Note:
Not all configuration information is provided for ease of illustration.

Mask registers are handled differently from normal registers. The complexity lies in that masks represent packed bit vectors and micro-operations end up reading and writing various bit fields based upon element size and micro-operation sequence number. For example, on a 128-bit wide machine, i.e., a machine with a vector length of 128 bits, a byte compare micro-operation writes 16-bits of a mask register. For a length multiplier equal to 8, there would be an 8 micro-operation sequence with each micro-operation writing 16-bit sub fields. The sequence would fill the entire 128-bit register. A double compare micro-operation writes 2-bits of a mask register. For a length multiplier equal to 8, there would be an 8 micro-operation sequence with each micro-operation writing 2-bits. The sequence would fill the lower 16-bit of the register and 1-fill the rest. Architecturally, most instructions that create a mask only write a portion of the mask register. Most instructions that use a mask only use a portion of the mask register.

As an example, with a machine width of 128 bits, element width of 1 byte, a length multiplier of 8, and a vector length of 128 bits, an 8-bit vector compare of the 8-register pairs returns a full register 128-bit length vector of mask bits. The scenario would be implemented with 8 micro-operations. The 1st micro-operation would write mask bits [15:0], the 2nd micro-operation would write bits [31:16] . . . and the 8th micro-operation would write bits [127:112]. This is shown as register mask 400A For another case with a machine width of 128 bits, element width of 1 double word (64 bits), a length multiplier of 8, and a vector length of 32 bits, a 64-bit vector compare of the 8-register pairs returns a 16-bit length vector of mask bits. The 1st micro-operation would write bits [1:0], the 2nd micro-operation would write bits [3:2] . . . the 8th micro-operation would write bits [15:14]. Register mask 400B is an example of partial masks for a half word (16 bits), register mask 400C is an example of partial masks for a word (32 bits), and register mask 400D is an example of partial masks for a double word (64 bits).

Figure 5:
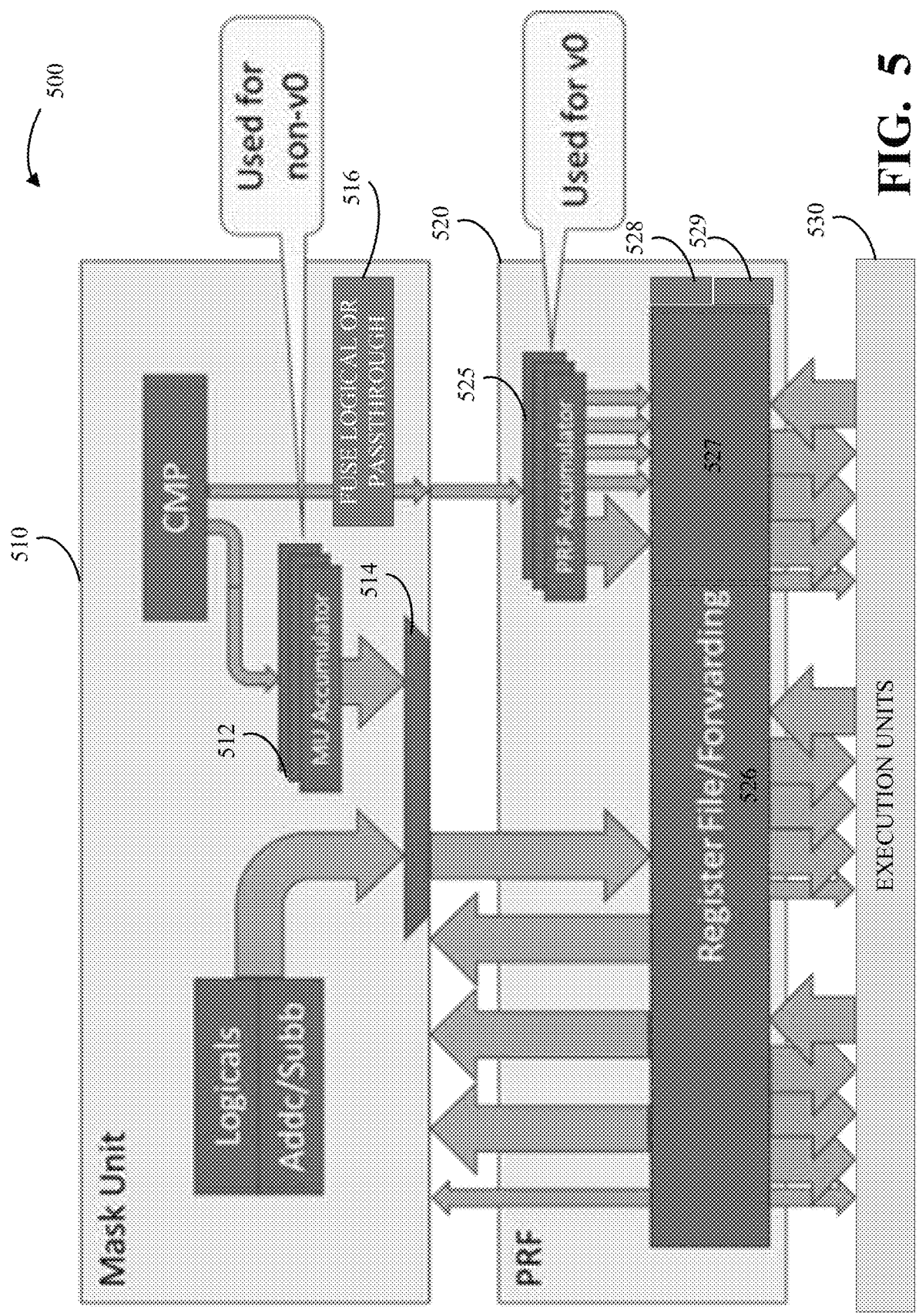
FIG. 5 is a block diagram illustrating an integrated circuit and flow for dependency tracking and chaining for vector instructions.

FIG. 5 is a block diagram illustrating a system and/or processor 500 with flow for dependency tracking and chaining for vector instructions. The system 500 includes a mask unit 510, a physical register file (PRF) 520 which includes a PRF accumulator 525, registers 526 and a dedicated register 527, and execution units 530. The mask unit 510 includes a mask unit accumulator 512 and a multiplexor 514. As described herein, the result from the mask unit 510 can be either a full register value or a single partial mask as produced by a single micro-operation. The system 500 and each component in the system 500 is illustrative and can include additional, fewer, or different components which may be similarly or differently architected without departing from the scope of the specification and claims herein. Moreover, the illustrated components can perform other functions without departing from the scope of the specification and claims herein.

The mask unit 510 optimizes handling of mask writing instructions by forwarding partial writes to the physical register file accumulator 525 in the physical register file 520. In implementations, the physical register file accumulator 525 may be flip-flops and/or other similar structures. The physical register file accumulator 525 accumulates the partial writes and the physical register file 520 and/or the physical register file accumulator 525 support partial register forwarding for execution in the execution units 530 and writing to the register file, e.g., to the registers 526, once all associated partial writes are completed. The registers 526 and the dedicated register(s) 527 may be also referred to as vector registers. The dedicated register(s) 527 is bit-writeable and/or bit-field writeable by the physical register file accumulator 525. To minimize a number of register ports, the most recent copies of the dedicated register(s) 527 may be cached outside of the physical register file 520. These would only be read as partial masks.

As stated, the mask unit 510 handles vector instructions that can generate a partial mask. For example, the vector instructions can include, but is not limited to, integer compares, floating-point compares, add-with-carry, and subtract-with-borrow. Compare instructions are frequently used to create element masks. When a length multiplier is greater than 1, a compare instruction is broken into multiple micro-operations with each writing a partial mask of the final result. The compare micro-operations read two vector registers, perform an element based compare, and write partial vector register results (referred to as a partial mask). If these micro-operations were to directly write into the register file, bit writes would be required (which does not lend well to custom register or latch based compact designs). Compare micro-operations can write to any vector register in the physical register file 520. The mask unit 510 can determine whether the compare micro-operation is writing to the dedicated register(s) 527 (i.e., those associated with architectural register V0 for example). In these instances, the partial results are likely to be used by another micro-operation in another instruction as a mask. To minimize latency (also referred to as chaining herein), the mask unit 510 can forward these partial mask results to the physical register file accumulator 525, which in turn can write to the dedicated register(s) 527 for use by the execution units 530. Compare micro-operations which write to non-dedicated register(s), such as registers 526, are accumulated in the mask unit accumulator 512 and when accumulation is complete, written back to the non-dedicated registers via the multiplexor 514. Therefore, when length multiplier is greater than 1, the mask unit 510 forwards these partial masks to other execution units 530 to minimize dataflow latency (otherwise the execution units would have to wait for all the compare micro-operations to finish before forwarding the full register result).

The dedicated register(s) 527 is associated with valid bits 528 and dependency bits 529, which are collectively used to track partial register readiness and/or availability and enable merging and/or chaining of micro-operations. The valid bits 528 and dependency bits 529 may be in the physical register file 520 or in registers outside the physical register file 520. In implementations, the number of valid bits 528 and dependency bits 529 is determined by a maximum value of the length multiplier of a producer vector micro-operation. As described herein, the dependency tracking for partial masks is handled by the issue queue or scheduler by using the valid bits 528 and dependency bits 529.

The dedicated register(s) 527 can be viewed as a normal register but with partial masks (bit-fields) that relate to the registers of a register group. For example, when the length multiplier equals 1, the result contains a single partial mask. When the length multiplier equals 8, the result contains 8 partial masks. When a compare instruction is executed, the number of elements in a register determine the number of bits in each partial mask. This varies by element width and by register length. For dependency tracking, a compare instruction with the dedicated register(s) 527 as a destination would have a single physical register file number destination and 8-valid bits tracking partial masks. For a length multiplier of 1, only the first valid bit is relevant. For a length multiplier of 8, all 8 valid bits are relevant.

In an example of chaining, a compare of size byte could directly feed an add byte instruction using element masks. For a length multiplier of 1, the compare micro-operation feeds the add micro-operation. For a length multiplier of 8, the 1st compare micro-operation would feed the 1st add micro-operation, the 2nd compare micro-operation would feed the 2nd add micro-operation, etc. Since the mask is produced and used under the same element size the partial mask fields and valid bits all line up. Table 2 shows an example for which register bits are associated with which partial masks fields for 128-bit registers where SEW is element width and MO is micro-operation.

compare instruction feeding a 32-bit add using element masks. The first 4 micro-operations of the add would be dependent on the 1st micro-operation of the compare, and the last 4 micro-operations of the add would be dependent on the 2nd micro-operation of the compare. A vector register renamer can track the SEW of the producer for a current dedicated register, and knows the SEW for a dependent instruction it is renaming. Thus, the renamer will provide for each dependent micro-operation using a mask the physical register file register (for the dedicated register) and which valid bits (up to 8) it is dependent on. The consumer instruction never needs to know the SEW of the producer instruction.

The mask unit 510 can handle various scenarios which produce either full register results or partial mask results as described herein. Although not all scenarios are described, they are within the scope of the specification and claims as described herein.

In the instance where the length multiplier is less than or equal to 1, the vector instruction is performed and full register results are returned to the registers 526 in the physical register file 520.

In the instance where the length multiplier is greater than 1 and a compare instruction writes to a dedicated register, the compare instruction is cracked into micro-operations by a decoder. Each micro-operation will execute and return a partial mask result to the physical register file accumulator 525 which caches the bit writes and can forward to other execution units 530 (the physical register file accumulator 525 is tagged with the destination register). The physical register file accumulator 525 will need to know how many writes to expect, determine when all results have been accumulated, and write the final result into the actual register file. For example, this can be done using valid and dependency bits as described herein. In implementations, there may be multiple physical register file accumulators and are a resource that may be managed by a scheduler in the mask unit or by the issue queue. The micro-operation will include a bit or bits indicating "write to dedicated register" to trigger partial result forwarding functionality. For example, the bit or bits may be valid and dependency bits which may be provided as provider valid masks and consumer dependency masks, respectively, as described herein. That is, the producing micro-operation will indicate when it is going to execute and which partial result of which physical register it will write using a result register tag and partial result valid

TABLE 2

| Register Bits | MO 0 | MO 1 | MO 2 | MO 3 | MO 4 | MO 5 | MO 6 | MO 7 |
|---|---|---|---|---|---|---|---|---|
| SEW = 8 | [15:0] | [31:16] | [47:32] | [63:48] | [79:64] | [95:80] | [111:96] | [127:112] |
| SEW = 16 | [7:0] | [15:8] | [23:16] | [31:24] | [39:32] | [47:40] | [55:48] | [63:56] |
| SEW = 32 | [3:0] | [7:4] | [11:8] | [15:12] | [19:16] | [23:20] | [27:24] | [31:28] |
| SEW = 64 | [1:0] | [3:2] | [5:4] | [7:6] | [9:8] | [11:10] | [13:12] | [15:14] |

When a producer instruction (with appropriate producer micro-operations) and a consumer instruction (with appropriate consumer micro-operations) are the same SEW, micro-operation N of the consumer instruction will be dependent upon micro-operation N of the producer instruction. When the producer instruction and consumer instruction have different SEWs, the dependency calculation changes, and the consumer micro-operation may have to wait for different and/or multiple producer micro-operations. For example, for a length multiplier of 8, assume a byte bits. The renamer will provide the consuming micro-operation the physical register tag and which result or results it is dependent on.

Mask logical instructions read two vector registers, perform a bit wise logical operation, and write a full vector register result. Mask logical instructions can write any vector register, but again if the destination is the dedicated register(s) 527 it is likely going to be used by another instruction as a mask register. There are cases where a compare micro-operation and/or instruction would write a register (could be either the dedicated register(s) 527 or registers 526) and then be used by a mask logical micro-operation and/or instruction that writes to the dedicated register(s) 527. For example, mask logical instructions are often used to combine compare results or invert a compare result (i.e., inverting a "less than" creates "a greater than or equal to") to create an element mask. The mask unit 510 or a scheduler associated with and/or in the mask unit 510 can determine or recognize these instances. Recognition is based on the mask unit 510 knowing that that there is a compare instruction ready to issue, a logical instruction waiting for a compare result, and that the logical instruction is writing to the dedicated register(s) 527. For these instances, the mask unit 510 can effectively fuse or merge the execution of the two instructions together (collectively a "fuse operation"). For these cases, the compare result would be accumulated by the mask unit accumulator 512 and written back. At the same time, the mask logical instruction would locally read the partial results from the compare instruction as they are produced, perform the appropriate logical operation, and provide partial mask results to the physical register file 520 and PRF accumulator 525 for accumulation and forwarding. The fuse operation, when detected, may be performed or executed by a fuse logical or passthrough unit 516.

Restated, the fusion operation involves a compare instruction followed by a logical instruction (e.g., AND, OR, XOR, etc.). The compare instructions generate partial results and the logical instructions read two whole registers. Typically, the logical instruction would have to wait for all the compare micro-operations to finish. By fusing the two instructions, the compare instruction and the logical instruction can be performed together and generate partial results without the wait. From a dependency standpoint, the fused instruction has three full register sources, two for the compare portion and an additional one for the logical portion. In this instance, valid masks may be used for the results of the fused instruction pair as described herein so that the result can be used by the next instruction as a mask if needed. At the same time, the machine can execute the compare portion, accumulate the result, and write back the full register result.

Operationally, a compare instruction would get two source PRF tags to read and a destination PRF tag to write. A logical instruction would get two source PRF tags to read and a destination tag to write. Both the compare instruction and the logical instruction are in the same scheduler for the same execution unit. The scheduler includes circuitry and logic to scan across its entries looking for: 1) a compare instruction, 2) a dependent logical instruction that is writing to V0, and 3) all other source dependencies have been met. The scheduler can then issue the fused compare/logical instruction, reading the two operands for the compare instruction and the one additional operand for the logical instruction. Both instructions, the compare and logical instructions are cleared from the scheduler. At execution, the compare instruction of the fused compare/logical instruction is performed, and the partial result goes to the MU accumulator (regardless of whether the compare writes V0 or not). The logical operation of the fused compare/logical instruction is also performed using the compare results and the appropriate bits from the other logical instruction source operand, i.e., performed by the fuse logical or passthrough unit 516. This logical result is sent to the PRF accumulator 525.

For purposes of illustration, consider the following three instruction sequences. In a first example, consider:
vsetivli r3, uimm, LMUL=4, SEW=32
compare v0, v4, v8
addm v12, v16, v20
where:
vsetivli instructions set the vtype and vl control and status registers (CSRs) based on their arguments, and write the new value of vl into rd (vsetivli rd, uimm, vtypei #rd=new vl, uimm=AVL, vtypei=new vtype setting);
LMUL is a length multiplier; and
SEW is element width.

In this example, since LMUL=4, the compare instruction is cracked into 4 micro-operations (MOs), with the $1^{st}$ MO producing bits 3:0 of V0, the $2^{nd}$ MO producing bits 7:4, the $3^{rd}$ MO producing bits 11:8, and the $4^{th}$ MO producing bits 15:12. The masked addm instruction is also cracked into 4 MOs with the $1^{st}$ using mask bits 3:0 of V0 (from the $1^{st}$ MO of the compare instruction), the $2^{nd}$ MO using bits 7:4, the $3^{rd}$ MO using bits 11:8 and the $4^{th}$ MO using bits 15:12 (assuming that appropriate dependencies are ready). For this example, the $1^4$ MO of the addm instruction has a mask dependency on the $1^4$ MO of the compare instruction, the $2^{nd}$ MO of the addm instruction has a mask dependency on the $2^{nd}$ MO of the compare instruction, the $3^{rd}$ MO of the addm instruction has a mask dependency on the $3^{rd}$ MO of the compare instruction, and the $4^{th}$ MO of the addm instruction has a mask dependency on the $4^{th}$ MO of the compare instruction. Table 3 and Table 4 show the dependencies between the producer (the compare instruction) and the consumer (the addm instruction) using the "*" to indicate relationships, respectively.

TABLE 3

| RegBits | MO 0 | MO 1 | MO 2 | MO 3 | MO 4 | MO 5 | MO 6 | MO 7 |
|---|---|---|---|---|---|---|---|---|
| Sew = 8 | [15:0] | [31:16] | [47:32] | [63:48] | [79:64] | [95:80] | [111:96] | [127:112] |
| Sew = 16 | [7:0] | [15:8] | [23:16] | [31:24] | [39:32] | [47:40] | [55:48] | [63:56] |
| Sew = 32 | [3:0]* | [7:4]** | [11:8]*** | [15:12]**** | [19:16] | [23:20] | [27:24] | [31:28] |
| Sew = 64 | [1:0] | [3:2] | [5:4] | [7:6] | [9:8] | [11:10] | [13:12] | [15:14] |

TABLE 4

| RegBits | MO 0 | MO 1 | MO 2 | MO 3 | MO 4 | MO 5 | MO 6 | MO 7 |
|---|---|---|---|---|---|---|---|---|
| Sew = 8 | [15:0] | [31:16] | [47:32] | [63:48] | [79:64] | [95:80] | [111:96] | [127:112] |
| Sew = 16 | [7:0] | [15:8] | [23:16] | [31:24] | [39:32] | [47:40] | [55:48] | [63:56] |
| Sew = 32 | [3:0]* | [7:4]** | [11:8]*** | [15:12]*** | [19:16] | [23:20] | [27:24] | [31:28] |
| Sew = 64 | [1:0] | [3:2] | [5:4] | [7:6] | [9:8] | [11:10] | [13:12] | [15:14] |

In a second example, consider:
vsetivli r3, uimm, LMUL=4, SEW=32
compare v0, v4, v8
vsetivli r3, uimm, LMUL=4, SEW=64
addm v12, v16, v20

In the second example, since LMUL=4, the compare instruction is again cracked into 4 MOs, with the $1^{st}$ MO producing bits 3:0 of V0, the $2^{nd}$ MO producing bits 7:4, the $3^{rd}$ MO producing bits 11:8, and the $4^{th}$ MO producing bits 15:12. The masked addm instruction is also cracked into 4 MOs with the $1^{st}$ MO using mask bits 1:0 of V0 (from the 1st MO of the compare instruction), the $2^{nd}$ MO using bits 3:2 of V0 (also from the $1^4$ MO of the compare instruction), the $3^{rd}$ MO using bits 5:4 of V0 (from the $2^{nd}$ MO of the compare instruction) and the $4^{th}$ MO using bits 7:6 (also from the $2^{nd}$ MO of the compare instruction) (assuming that appropriate dependencies are ready). The addm instruction is not dependent upon MO 2 or MO 3 of the compare instruction. Table 5 and Table 6 show the dependencies between the producer (the compare instruction) and the consumer (the addm instruction) using the "*" to indicate relationships, respectively:

TABLE 5

| RegBits | Uop-0 | Uop-1 | Uop-2 | Uop-3 | Uop-4 | Uop-5 | Uop-6 | Uop-7 |
|---|---|---|---|---|---|---|---|---|
| Sew = 8 | [15:0] | [31:16] | [47:32] | [63:48] | [79:64] | [95:80] | [111:96] | [127:112] |
| Sew = 16 | [7:0] | [15:8] | [23:16] | [31:24] | [39:32] | [47:40] | [55:48] | [63:56] |
| Sew = 32 | [3:0]* | [7:4]** | [11:8] | [15:12] | [19:16] | [23:20] | [27:24] | [31:28] |
| Sew = 64 | [1:0] | [3:2] | [5:4] | [7:6] | [9:8] | [11:10] | [13:12] | [15:14] |

TABLE 6

| RegBits | Uop-0 | Uop-1 | Uop-2 | Uop-3 | Uop-4 | Uop-5 | Uop-6 | Uop-7 |
|---|---|---|---|---|---|---|---|---|
| Sew = 8 | [15:0] | [31:16] | [47:32] | [63:48] | [79:64] | [95:80] | [111:96] | [127:112] |
| Sew = 16 | [7:0] | [15:8] | [23:16] | [31:24] | [39:32] | [47:40] | [55:48] | [63:56] |
| Sew = 32 | [3:0] | [7:4] | [11:8] | [15:12] | [19:16] | [23:20] | [27:24] | [31:28] |
| Sew = 64 | [1:0]* | [3:2]* | [5:4]** | [7:6]** | [9:8] | [11:10] | [13:12] | [15:14] |

In a third example, consider:
vsetivli r3, uimm, LMUL=4, SEW=32
compare v0, v4, v8
vsetivli r3, uimm, LMUL=4, SEW=16
addm v12, v16, v20

In the third example, since LMUL=4, the compare instruction is again cracked into 4 MOs, with the $1^{st}$ MO producing bits 3:0 of V0, the $2^{nd}$ MO producing bits 7:4, the $3^{rd}$ MO producing bits 11:8, and the $4^{th}$ MO producing bits 15:12. The masked addm instruction is also cracked into 4 MOs with the $1^{st}$ addm MO using mask bits 7:0 of V0 (requiring results from both the $1^{st}$ and $2^{nd}$ MOs of the compare instruction), and the $2^{nd}$ addm MO using bits 15:8 of V0 (requiring results from both the $3^{rd}$ and $4^{th}$ MOs of the compare instruction) (assuming that appropriate dependencies are ready). Table 7 and Table 8 show the dependencies between the producer (the compare instruction) and the consumer (the addm instruction) using the "*" to indicate relationships, respectively:

TABLE 7

| RegBits | Uop-0 | Uop-1 | Uop-2 | Uop-3 | Uop-4 | Uop-5 | Uop-6 | Uop-7 |
|---|---|---|---|---|---|---|---|---|
| Sew = 8 | [15:0] | [31:16] | [47:32] | [63:48] | [79:64] | [95:80] | [111:96] | [127:112] |
| Sew = 16 | [7:0] | [15:8] | [23:16] | [31:24] | [39:32] | [47:40] | [55:48] | [63:56] |
| Sew = 32 | [3:0]* | [7:4]* | [11:8]** | [15:12]** | [19:16] | [23:20] | [27:24] | [31:28] |
| Sew = 64 | [1:0] | [3:2] | [5:4] | [7:6] | [9:8] | [11:10] | [13:12] | [15:14] |

TABLE 8

| RegBits | Uop-0 | Uop-1 | Uop-2 | Uop-3 | Uop-4 | Uop-5 | Uop-6 | Uop-7 |
|---|---|---|---|---|---|---|---|---|
| Sew = 8 | [15:0] | [31:16] | [47:32] | [63:48] | [79:64] | [95:80] | [111:96] | [127:112] |
| Sew = 16 | [7:4, 3:0]* | [15:12, 11:8]** | [23:16] | [31:24] | [39:32] | [47:40] | [55:48] | [63:56] |
| Sew = 32 | [3:0] | [7:4] | [11:8] | [15:12] | [19:16] | [23:20] | [27:24] | [31:28] |
| Sew = 64 | [1:0] | [3:2] | [5:4] | [7:6] | [9:8] | [11:10] | [13:12] | [15:14] |

Operationally, for the compare instruction (i.e., partial mask producer), an 8-bit producer valid mask is generated signifying which partial mask field is being written by a particular MO. For a producer, MO 1 would have mask=b00000001, MO 2 would have a mask=b00000010, MO 3 would have a mask=b00000100, etc. The actual register bits represented by a mask bit are determined by the element width (i.e., SEW) of the producer. If the producer SEW=32, then mask b00000001 represents bits [3:0] and mask b00000010 represents bits [7:4] of the result. If the producer SEW=8, then mask b00000001 represents bits [15:0] and mask b00000010 represents bits [31:16] of the result.

To determine producer to consumer dependency, a decoder (or it could be handled in a sequencer or a register renamer) must remember the element width of the last producer (i.e., the appropriate circuitry records the element width of the last producer) and compare it to the element width of the consumer. The renamer, for example, uses the element width of the last producer and the element width of the consumer to generate, based on Table 2, consumer dependency masks. For the first example above, the consumer masks would be:

MO 1 mask=b00000001;
MO 2 mask=b00000010;
MO 3 mask=b00000100; and
MO 4 mask=b00001000.

For the second example above, the consumer mask would be:

MO 1 mask=b00000001;
MO 2 mask=b00000001;
MO 3 mask=b00000010; and
MO 4 mask=b00000010.

For the third example above, the consumer mask would be:

MO 1 mask=b00000011; and
MO 2 mask=b00001100.

Typical register dependencies are tracked by having the producer broadcast its PRF number when it is scheduled for execution, and consumer instructions compare that PRF number with what they are dependent upon (and clearing matching dependencies in the scheduler). If all their dependencies have been cleared, they can be picked for execution.

For V0 dependencies, the PRF and fields which are valid are tracked. For the above examples, when a compare is scheduled for execution, it broadcasts its PRF number and its producer valid mask. The dependent masked add instructions (i.e., consumer instruction) would first compare the PRF number and then the associated producer valid mask against their consumer dependency mask, clearing matching dependencies. For instance, in the third example above, the masked addm instruction would need to see two matching compare instruction results to clear its dependencies.

In the above examples, if we assume at the renamer that the compare instruction is assigned to write V0 PRF=3, then when the compare instruction MO 0 schedules for execution it will broadcast V0 PRF=3, MASK=1. When MO 1 schedules for execution it will broadcast V0 PRF=3, MASK=2, etc.

When then the addm instruction goes thru the renamer it will be informed it has a mask dependency on V0 PRF=3, and each MO will be given a consumer mask (based upon producer SEW and consumer SEW as shown in the examples above) (other source dependencies are being ignored for purposes of ease of illustration). When the addm is dispatched, it is informed if any MOs of the compare writing V0 PRF=3 have already been executed and will clear its consumer dependency mask bits as appropriate. While in the scheduler and/or issue queue, the consumer MO will monitor execution traffic (PRF number and producer valid mask of executing MOs) and continue to clear matching consumer dependency mask bits as appropriate. When all dependencies have been cleared (mask bits and other source registers), the addm MO may be picked/scheduled for execution.

In the instance where the length multiplier is greater than 1 and a compare instruction writes to register other than the dedicated register, the compare instruction is cracked into micro-operations by a decoder. Each micro-operation will execute and produce a partial mask result which is captured locally in a mask unit accumulator 512. The mask unit accumulator 512 will need to know how many writes to expect, determine when all results have been accumulated, and write the result to the register file. For example, this can be done using valid and/or dependency bits, as appropriate and applicable as described herein. In implementations, there are multiple mask unit accumulators and they are a resource that will be managed by a scheduler in the mask unit or by the issue queue.

In the instance where the length multiplier is greater than 1 and a compare instruction feeds a mask logical writing the dedicated register (e.g., fusing), the compare instruction is cracked into micro-operations by the decoder and the mask logical is decoded into a single micro-operation. The mask unit 510 and/or scheduler in the mask unit 510 will recognize and fuse this scenario using the fuse logical or passthrough unit 516. This will require the operands for the compare and unrelated one for the mask logical all to be ready. For example, this can be done using valid and/or dependency bits, as appropriate and applicable as described herein. When this scenario is recognized, the compare micro-operations will write partial mask results into the local mask unit accumulator 512 (regardless of whether the compare writes into the dedicated register or not) and the fuse logical or passthrough unit 516 will perform the related bit-wise portion of the logical operation writing a partial mask result to the physical file register accumulator 525. The intent is to minimize latency on waiting for the compare operation to complete before performing the logical operation.

Mask logical instructions read two vector registers, perform a bit wise logical operation, and write a full vector register result. Mask logical instructions can write any vector register, but again if the destination is the dedicated register(s) 527 it is likely going to be used by another instruction as a mask register. There are cases where a compare micro-operation and/or instruction would write a register (could be either the dedicated register(s) 527 or registers 526) and then be used by a mask logical micro-operation and/or instruction that writes to the dedicated register(s) 527. For example, mask logical instructions are often used to combine compare results or invert a compare result (i.e., inverting less than creates a greater than equal) to create an element mask. The mask unit 510 or a scheduler associated with and/or in the mask unit 510 can determine or recognize these instances. Recognition is based on the mask unit 510 knowing that that there is a compare instruction ready to issue, a logical instruction waiting for a compare result, and that the logical instruction is writing to the dedicated register (s) 527. For these instances, the mask unit 510 can effectively fuse or merge the execution of the two instructions together (collectively a "fuse operation"). For these cases, the compare result would be accumulated by the mask unit accumulator 512 and written back. At the same time, the mask logical instruction would locally read the partial results from the compare instruction as they are produced, perform the appropriate logical operation, and provide partial mask results to the physical register file 520 and PRF accumulator 525 for accumulation and forwarding. The fuse operation, when detected, may be performed or executed by a fuse logical or passthrough unit 516.

Restated, the fusion operation involves a compare instruction followed by a logical instruction (e.g., AND, OR, XOR, etc.). The compare instructions generate partial results and the logical instructions read two whole registers. Typically, the logical instruction would have to wait for all the compare micro-operations to finish. By fusing the two instruction, the compare instruction and the logical instruction can be performed together and generate partial results without the wait. From a dependency standpoint, the fused instruction has three full register sources, two for the compare portion and an additional one for the logical portion. In this instance, valid masks may be used for the results of the fused instruction pair as described herein so that the result can be used by the next instruction as a mask if needed. At the same time, the machine can execute the compare portion, accumulate the result, and write back the full register result.

Operationally, a compare instruction would get two source PRF tags to read and a destination PRF tag to write. A logical instruction would get two source PRF tags to read and a destination tag to write. Both the compare instruction and the logical instruction are in the same scheduler for the same execution unit. The scheduler includes circuitry and logic to scan across its entries looking for: 1) a compare instruction, 2) a dependent logical instruction that is writing to V0, and 3) all other source dependencies have been met. The scheduler can then issue the fused compare/logical instruction, reading the two operands for the compare instruction and the one additional operand for the logical instruction. Both instructions, the compare and logical instructions are cleared from the scheduler. At execution, the compare instruction of the fused compare/logical instruction is performed, and the partial result goes to the MU accumulator (regardless of whether the compare writes V0 or not). The logical operation of the fused compare/logical instruction is also performed using the compare results and the appropriate bits from the other logical instruction source operand, i.e., performed by the fuse logical or passthrough unit 516. This logical result is sent to the PRF accumulator 525.

In the instance where the length multiplier is greater than 1 and the instruction is a partial mask producing add-with-carry or sub-with-borrow, the instruction is cracked into micro-operations by the decoder. Each micro-operation will execute producing a partial mask result which is cached locally in a mask unit accumulator. The mask unit accumulator will need to know how many writes to expect, determine when all the results have been accumulated, and write the final full register result to the physical register file. For example, this can be done using valid bits as described herein. Subsequent sum producing add-with-carry or sub-with-borrow using the carries could forward from this mask unit accumulator at the partial mask level (all within the mask unit).

Figure 6:
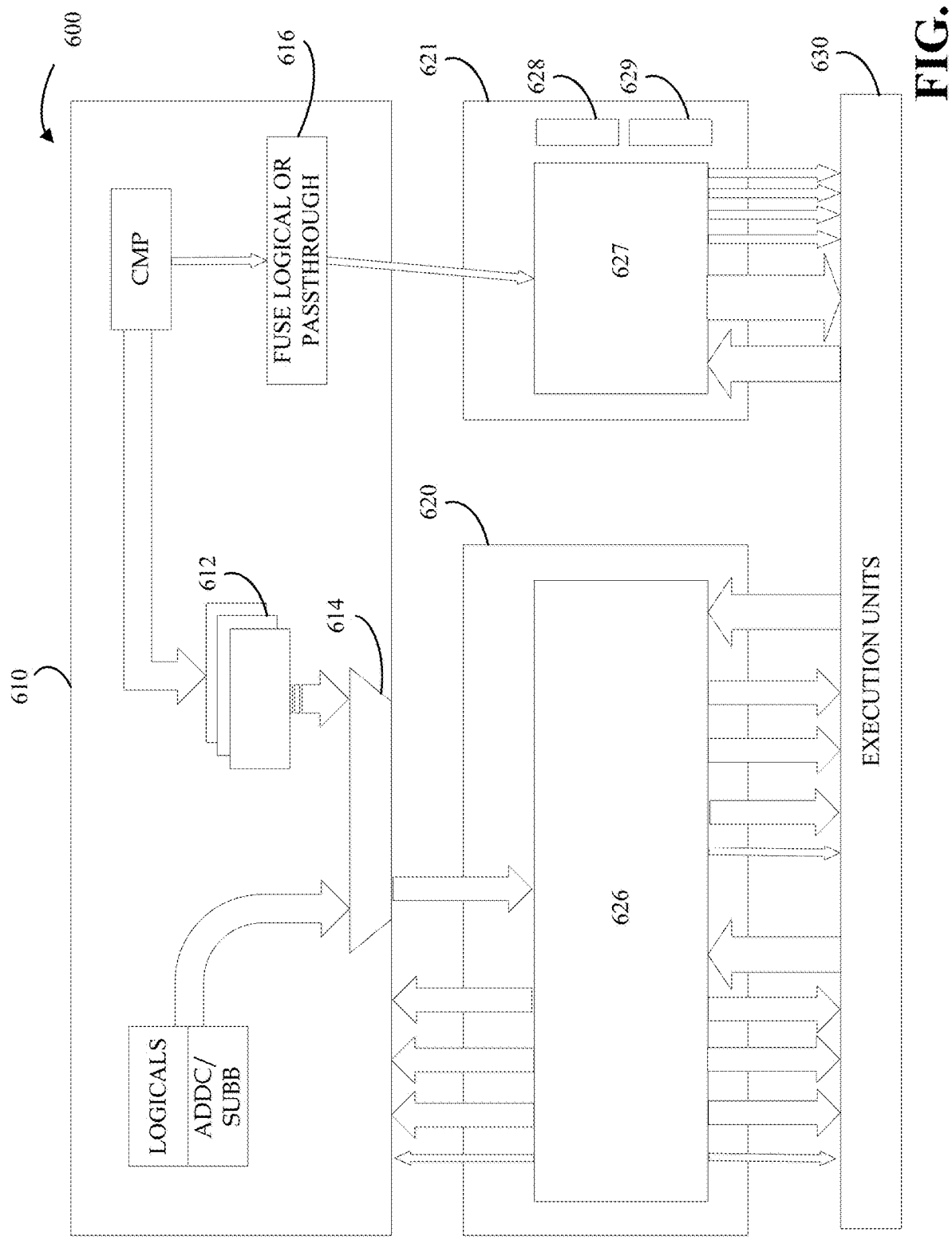
FIG. 6 is a block diagram illustrating an integrated circuit and flow for dependency tracking and chaining for vector instructions.

FIG. 6 is a block diagram illustrating a system and/or processor 600 with flow for dependency tracking and chaining for vector instructions. The system 600 includes a mask unit 610, a physical register file 620 which includes registers 626, a mask physical register file 621 which includes mask registers 627, and execution units 630. The mask unit 610 includes a mask unit accumulator 612, a multiplexor 614, and fuse logic and passthrough unit 616. Each mask register 627 may include or be associated with valid bits 629. As described herein, the result from the mask unit 600 can be either a full register value or a single partial mask as produced by a single micro-operation. The system 600 and each component in the system 600 is illustrative and can include additional, fewer, or different components which may be similarly or differently architected without departing from the scope of the specification and claims herein. Moreover, the illustrated components can perform other functions without departing from the scope of the specification and claims herein.

The system 600 is functionally similar to the system and/or processor 500 except as described herein. The mask physical register file 621 and mask registers 627 are N-entry bit writeable registers and allocate as a separate resource from the physical register file 620 and registers 626. The mask physical register file 621 and mask registers 627 collectively represent the dedicated register (e.g., the physical registers associated with the architectural register V0) and can be read and/or written as any other full width register, or can be read and/or written as partial registers (i.e., masks). The physical register file accumulator of FIG. 5 is collectively replaced with the mask physical register file 621 and mask registers 627 (instead of the physical register file accumulator acting as a cache). The mask registers 627 are not allocated into the physical register file 620 since mask registers 627 might later be used as a mask. For dependency checking, the issue logic (as provided by the issue queue or scheduler) can track a mask physical register file 621/mask registers 627 number and up to 8-valid bits. As described herein, partial sources (e.g., for chaining purposes) can be dependent upon 1 or more partial writes.

Figure 7:
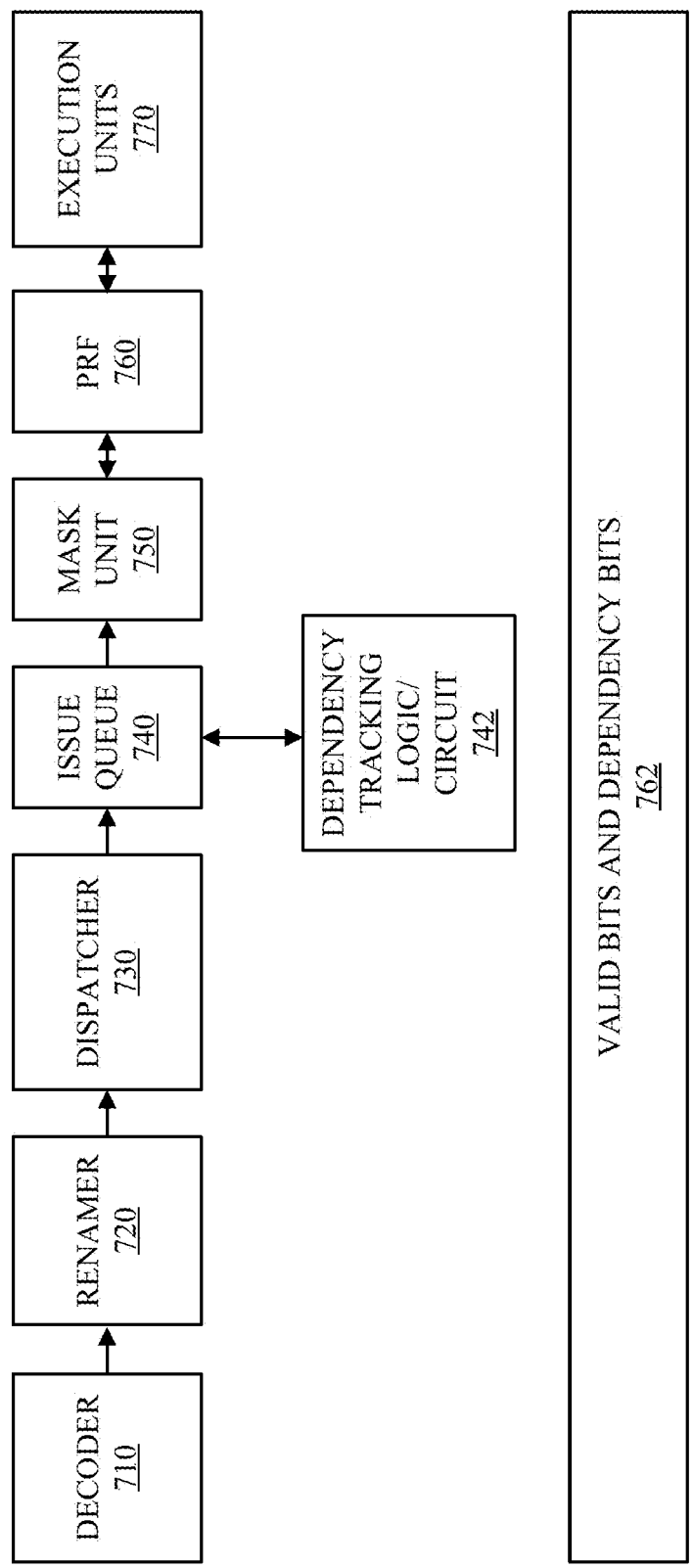
FIG. 7 is a block diagram illustrating an integrated circuit and flow for dependency tracking and chaining for vector instructions.

FIG. 7 is a block diagram of a processor or system 700 which illustrates processing flow between a decoder 710, a renamer 720, a dispatcher 730, an issue queue 740, a mask unit 750, a physical register file 760, and execution units 770. The system 700 could be a pipeline as shown in FIG. 3, a system 500. The system 700 and each component in the system 700 is illustrative and can include additional, fewer, or different components which may be similarly or differently architected without departing from the scope of the specification and claims herein. Moreover, the illustrated components can perform other functions without departing from the scope of the specification and claims herein.

The decoder 710 is responsible, in relevant part, for receiving and decoding an instruction, such as a vector instruction, into micro-operations.

The renamer 720 is responsible, in relevant part, for renaming the register specifiers in an instruction by mapping them to a new space of physical registers. For purposes of chaining, the renamer determines a mapping between producer micro-operations and consumer micro-operations based at least on element width. For each dependent micro-operation, the renamer identifies the relevant valid bits (as associated with the producer micro-operations) in the mask register and the relevant dependency bits (as associated with the consumer micro-operations).

The dispatcher 730 is responsible, in relevant part, for dispatching the micro-operations for execution.

The issue queue 740 is responsible, in relevant part, for issuing a micro-operation when data is ready for the micro-operation. For purposes of chaining, dependency tracking logic and/or circuit 742 in the issue queue tracks readiness of identified valid bits and status of the dependency bits for the micro-operation. In implementations, the dependency tracking logic and/or circuit 742 may be done by a scheduler.

In implementations, the dependency tracking logic and/or circuit 742 may be done by a scheduler in the mask unit 750.

The mask unit 750 and the physical register file 760 are responsible for full and partial result forwarding, tracking, and chaining execution as described herein.

The execution units 770 is responsible, in relevant part, for executing the micro-operation when the data is ready for the micro-operation.

Figure 8:
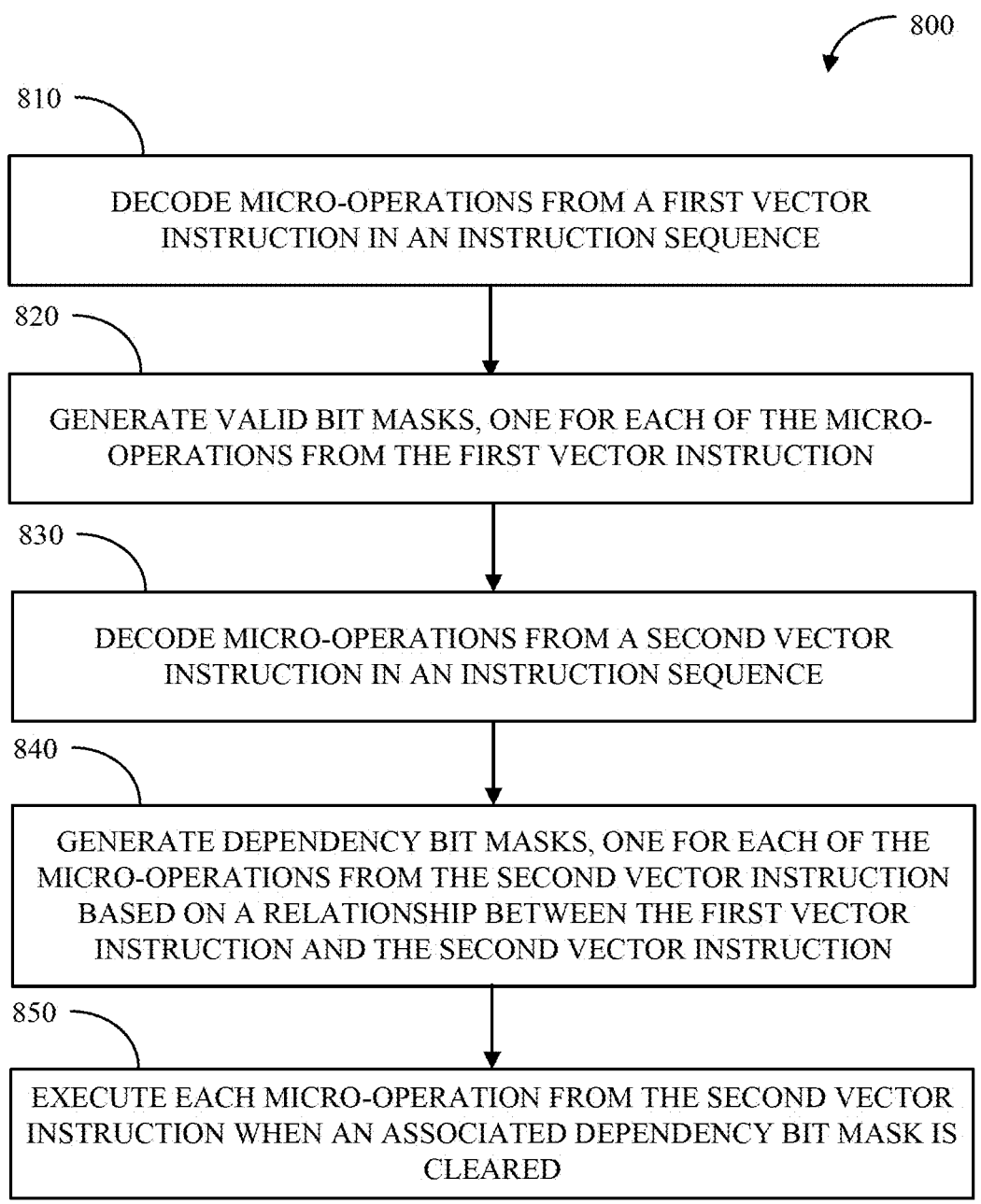
FIG. 8 is a flow chart of a method for dependency tracking and chaining for vector instructions.

FIG. 8 is a flow chart of a method 800 for dependency tracking, chaining, and/or fusing for vector instructions. The method 800 may include: decoding 810 micro-operations from a first vector instruction in an instruction sequence; generating 820 valid bit masks, one for each of the micro-operations from the first vector instruction; decoding 830 micro-operations from a second vector instruction in an instruction sequence; generating 840 dependency bit masks, one for each of the micro-operations from the second vector instruction based on a relationship between the first vector instruction and the second vector instruction; and executing 850 each micro-operation from the second vector instruction when an associated dependency bit mask is cleared. The method 800 may be performed in the system 300 of FIG. 3, the processor and/or system 500 of FIG. 5, the processor and/or system 600 of FIG. 6, the processor and/or system 700 or FIG. 7, and/or components therein.

The method 800 may include decoding 810 micro-operations from a first vector instruction in an instruction sequence and generating 820 valid bit masks, one for each of the micro-operations from the first vector instruction. An instruction sequence may include multiple instructions including, for example, a first vector instruction and a second vector instruction, where the second vector instruction is dependent, in part, on results or data from execution of the first vector instruction. In implementations, the first vector instruction may indicate that data is written to an architectural or logical register V0. The architectural or logical register V0 may be associated with a mask register as described herein. A mask register is a bit-wise and/or bit-field writeable register. In implementations, the mask register may be a dedicated register in the physical register file, a mask physical register file, and/or other registers. In implementations, data or results generated from execution of the micro-operations from the first vector instruction can be written to different fields, bits, or portions (collectively "portion") of the mask register. The valid bit mask indicates which portion of the mask register is associated with the micro-operation. A vector length, element width, and length multiplier may determine which portion of the mask register is written to for a micro-operation.

The method 800 may include decoding 830 micro-operations from a second vector instruction in an instruction sequence and generating 840 dependency bit masks, one for each of the micro-operations from the second vector instruction based on a relationship between the first vector instruction and the second vector instruction. In implementations, the relationship is based on the element width of the first vector instruction and the element width of the second vector instruction. That is, which valid bit masks from the first vector instruction are needed for execution for each of the micro-operations from the second vector instruction. Stated in another way, how are micro-operations from the first vector instruction related to micro-operations from the second vector instruction. In other words, dependency bits indicate which valid bits are needed for execution. Restated, the dependency bit masks may express an N-to-1 or 1-to-N relationship between the first vector instruction (or the set of micro-operations therein) and the second vector instruction (or the set of micro-operations therein).

The method 800 may include executing 850 each micro-operation from the second vector instruction when an associated dependency bit mask is cleared. Micro-operations from the first vector instruction broadcast a mask register number and valid bit mask when the micro-operation is scheduled for execution. Upon dispatch, the second vector instruction is informed if any matching micro-operations from the first vector instruction have executed. If so, appropriate dependency mask bits are cleared. While in the scheduler, pending micro-operations from the second vector instruction monitor execution traffic (mask register number and valid bit masks of executing micro-operations of the first vector instruction) and continue to clear matching dependency mask bits as appropriate.

Figure 9:
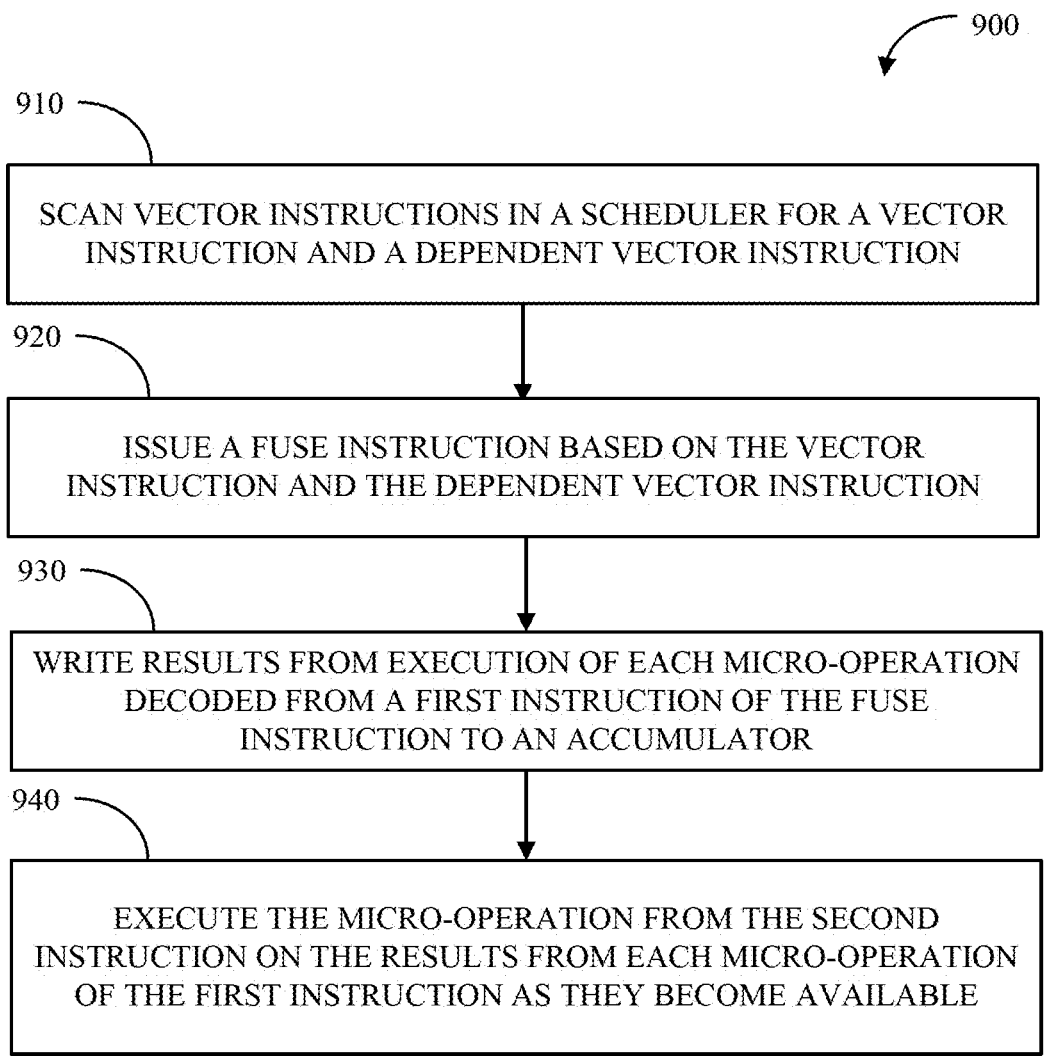
FIG. 9 is a flow chart of a method for dependency tracking and chaining for vector instructions.

FIG. 9 is a flow chart of a method 900 for dependency tracking, chaining, and/or fusing for vector instructions. The method 900 may include: scanning 910 vector instructions in a scheduler for a vector instruction and a dependent vector instruction; issuing 920 a fuse instruction based on the vector instruction and the dependent vector instruction; writing 930 results from execution of each micro-operation decoded from a first instruction of the fuse instruction to an accumulator; and executing 940 the micro-operation from the second instruction on the results from each micro-operation of the first instruction as they become available. The method 900 may be performed in the system 300 of FIG. 3, the processor and/or system 500 of FIG. 5, the processor and/or system 600 of FIG. 6, the processor and/or system 700 or FIG. 7, and/or components therein.

The method 900 may include scanning 910 vector instructions in a scheduler for a vector instruction and a dependent vector instruction and issuing 920 a fuse instruction based on the vector instruction and the dependent vector instruction. A mask unit or a scheduler may review entries in a scheduler to determine if two vector instructions have results or data dependencies. In implementations, the dependent vector instruction may indicate that data is written to an architectural or logical register V0. The architectural or logical register V0 may be associated with a mask register as described herein. A mask register is a bit-wise and/or bit-field writeable register. In implementations, the mask register may be a dedicated register in the physical register file, a mask physical register file, and/or other registers.

The method 900 may include writing 930 results from execution of each micro-operation decoded from a first instruction of the fuse instruction to an accumulator. Each micro-operation is executed and results are provided to an accumulator local to a mask unit. The contents of the accumulator can be read locally by execution units in a mask unit such as a fuse logical or passthrough unit 516.

The method 900 may include executing 940 the micro-operation from the second instruction on the results from each micro-operation of the first instruction as they become available. The logical result may be sent to the PRF accumulator and processed as described herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
  a renamer configured to:
    generate, for each micro-operation decoded from a first vector instruction, a corresponding valid bit mask that specifies a portion of a mask register to be written by results from execution of that micro-operation; and
    generate, for each micro-operation decoded from a second vector instruction, a corresponding dependency bit mask that is determined based on a relationship between the first vector instruction and the second vector instruction; and
  an issue queue configured to:
    determine, for each micro-operation decoded from the second vector instruction and based on the corresponding dependency bit mask, corresponding one or more micro-operations decoded from the first vector instruction; and
    issue each micro-operation decoded from the second vector instruction for execution, wherein issuance occurs when the corresponding dependency bit mask is cleared in response to execution of the corresponding one or more micro-operations decoded from the first vector instruction.

2. The integrated circuit of claim 1, wherein the issue queue is further configured to:
  track, for each micro-operation decoded from the second vector instruction, execution of the corresponding one or more micro-operations decoded from the first vector instruction using one or more valid bit masks associated with the corresponding one or more micro-operations decoded from the first vector instruction or one or more mask registers associated with the corresponding one or more micro-operation decoded from the first vector instructions.

3. The integrated circuit of claim 1, wherein the dependency bit mask associated with each micro-operation decoded from the second vector instruction indicates a corresponding one or more valid bit masks associated with the first vector instruction relevant for execution of a respective micro-operation decoded from the second vector instruction.

4. The integrated circuit of claim 1, wherein the dependency bit mask associated with each micro-operation decoded from the second vector instruction indicates the corresponding one or more micro-operations decoded from the first vector instruction relevant for execution of a respective micro-operation decoded from the second vector instruction.

5. The integrated circuit of claim 1, wherein the dependency bit mask indicates an N-to-1 or 1-to-N relationship between the first vector instruction and the second vector instruction.

6. The integrated circuit of claim 1, wherein each valid bit mask is related to an element width for the first vector instruction.

7. The integrated circuit of claim 1, wherein the relationship is between element width for the first vector instruction and element width for the second vector instruction.

8. The integrated circuit of claim 1, further comprising:
  a mask unit to process the first vector instruction by sending results from each micro-operation decoded from the first vector instruction to an accumulator when the first vector instruction indicates writing to the mask register.

9. The integrated circuit of claim 8, wherein the accumulator is configured to:
  write each of the results in the mask register for use by execution units;
  accumulate the results from each micro-operation decoded from the first vector instruction; and
  write to a register once all results are accumulated from each micro-operation decoded from the first vector instruction.

10. A method comprising:
  generating, by a renamer, for each micro-operation decoded from a first vector instruction, a corresponding valid bit mask that specifies a portion of a mask register to be written by results from execution of that micro-operation;
  generating, by the renamer, for each micro-operation decoded from a second vector instruction, a corresponding dependency bit mask that is determined based on a relationship between the first vector instruction and the second vector instruction;
  determining, for each micro-operation decoded from the second vector instruction and based on the corresponding dependency bit mask, corresponding one or more micro-operations decoded from the first vector instruction; and
  issuing, by an issue queue, each micro-operation decoded from the second vector instruction for execution, wherein said issuing occurs when the corresponding dependency bit mask is cleared based on execution of the corresponding one or more micro-operations decoded from the first vector instruction.

11. The method of claim 10, further comprising:
  tracking, by the issue queue, for each micro-operation decoded from the second vector instruction, execution of the corresponding one or more micro-operations decoded from the first vector instruction using one or more valid bit masks associated with the corresponding micro-operations or one or more mask registers associated with the corresponding one or more micro-operations decoded from the first vector instruction.

12. The method of claim 10, wherein the dependency bit mask associated with each micro-operation decoded from the second vector instruction indicates the corresponding one or more micro-operations decoded from the first vector instruction.

13. The method of claim 10, wherein the dependency bit mask associated with each micro-operation decoded from the second vector instruction indicates the corresponding one or more micro-operations decoded from the first vector instruction relevant for execution of a respective micro-operation decoded from the second vector instruction.

14. The method of claim 10, wherein each valid bit mask is related to an element width for the first vector instruction.

15. The method of claim 10, wherein the relationship is between element width for the first vector instruction and element width for the second vector instruction.

16. The method of claim 10, further comprising:
  processing, by a mask unit, the first vector instruction by sending results from each micro-operation decoded from the first vector instruction to an accumulator when the first vector instruction indicates writing to the mask register.

17. The method of claim 16, further comprising:
  writing, by the accumulator, each of the results in the mask register for use by execution units;

accumulating, by the accumulator, the results from each micro-operation decoded from the first vector instruction; and writing, by the accumulator, to a register once all results are accumulated from each micro-operation decoded from the first vector instruction.

\* \* \* \* \*